United States Patent
Sterly

[15] 3,690,679

[45] Sept. 12, 1972

[54] REPEAT MEANS FOR A CASSETTE CHANGER

[72] Inventor: Glenn E. Sterly, Carol Stream, Ill.

[73] Assignee: Ampex Corporation, Redwood City, Calif.

[22] Filed: Nov. 10, 1969

[21] Appl. No.: 875,305

[52] U.S. Cl. ....................274/4 F
[51] Int. Cl. ....................G11b 23/12
[58] Field of Search ....................274/4 F, 10 R; 353/15; 352/6–8; 242/197–200; 179/100.2 Z

[56] References Cited

UNITED STATES PATENTS

| | | | |
|---|---|---|---|
| 3,359,665 | 12/1967 | Gerry | 274/4 F UX |
| 3,385,534 | 5/1968 | Staar | 242/200 |
| 3,408,139 | 10/1968 | Schwartz | 274/4 F |
| 2,371,222 | 3/1945 | Compar | 274/10 R |
| 3,127,178 | 3/1964 | Osborne | 274/4 F |

FOREIGN PATENTS OR APPLICATIONS

| | | | |
|---|---|---|---|
| 1,578,053 | 7/1969 | France | 274/4 F |

*Primary Examiner*—Leonard Forman
*Assistant Examiner*—Dennis A. Dearing
*Attorney*—Fitch, Even, Tabin and Luedeka and Robert G. Clay

[57] ABSTRACT

A repeat playback capability is provided for cassette changers having a magazine for storing a series of cassettes therein. Preferably, a manually operable selector is provided to disable a feed mechanism for the magazine so that the magazine remains stationary and the same cassette is recycled for playing until the repeat selector is returned to a non-repeat position.

2 Claims, 5 Drawing Figures

Patented Sept. 12, 1972 3,690,679

2 Sheets-Sheet 1

INVENTOR
Glenn E. Sterly
Anderson, Luedeka, Fitch, Even & Tabin ATTYS.

Patented Sept. 12, 1972

3,690,679

2 Sheets-Sheet 2

INVENTOR
Glenn E. Sterly

Anderson, Luedeka, Fitch, Even & Tabin ATTYS.

REPEAT MEANS FOR A CASSETTE CHANGER

This invention relates generally to a tape cassette changer apparatus of the kind which automatically transfers cassettes stored in a magazine to an operative position within the changer for playing and, more particularly, to a repeat mechanism for causing a replaying of the cassette.

In a cassette changer of a known kind, the cassette magazine has a series of compartments each of which is adapted to receive and store a cassette therein. At the cessation of a playing from or recording on a tape in a first cassette, the magazine is automatically stepped to bring the next cassette into a position for transfer from a storage compartment to a playing position within the changer at which the tape is fed past a sound transducer sound head to record or playback. After the tape has completed a playing cycle, the cassette is automatically ejected and returned through the transfer station to its storage compartment within the magazine. The magazine then automatically shifts to bring the next compartment into position for transferring the next cassette therein, if a cassette is present, into the operative playing position.

In this known cassette changer, each cassette may be played only once and there is no provision for providing an automatic replay of any given cassette. Often, however, it is desired to hear a repeat of a particular recorded selection. Hence, a need exists for a repeat play capability in cassette changers having a magazine for cassettes and for a simple and easy to operate repeat mode of operation.

Accordingly, a general object of the invention is to provide a repeat play mode of operation for a cassette changer of the foregoing kind. Other objects and advantages of the invention will become apparent from the detailed description taken in connection with the accompanying drawings in which.

Figures 3, 4:
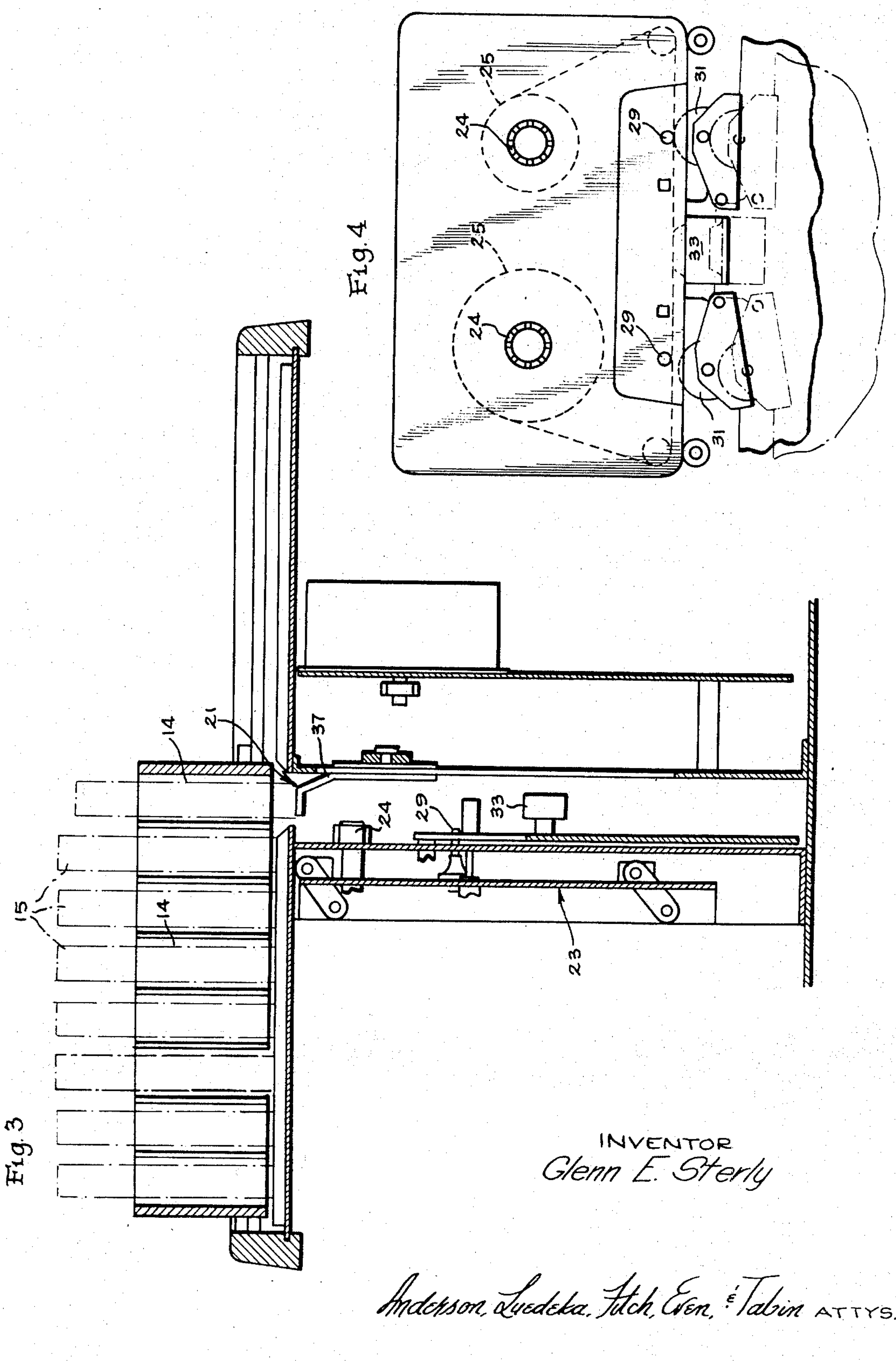
FIG. 3 is a partial sectional view showing the cassette storage magazine and cyclically operable means for transferring the cassette to and from the playback or recording station.
FIG. 4 is a diagrammatic view of the cassette and a pause carrier having a sound transducer head and tape feed pinch rollers.

As shown in the drawings for purposes of illustration, the invention is embodied in a cassette changer 11 having a magazine 13 with a series of storage compartments 14 (FIG. 3) each of which is adapted to receive and hold in a storage a tape cassette 15. In the usual play or record mode of operation, the magazine is moved step by step by a feed means to shift consecutively each of its successive compartments 14 into a transfer station 21. At the transfer station a cyclically operable means causes the cassette to transfer from the magazine to a shiftable carriage 23 which lowers the cassette and simultaneously inserts spindles 24 into reels 25 of the cassette and projects a capstan 29 into the cassette to form a nip with a pinch roller 31 to feed the tape past a transducer head 33 during a playback or recording operation. The motion of the tape is sensed and when the tape is stripped from one reel and wound on the other reel, an automatic ejection of the cassette is initiated and an elevator 37 returns the cassette into the compartment from which it was extracted. The feed means then automatically steps the magazine to align an immediately succeeding compartment and its cassette for transfer to the transducer head for playback. Thus, each cassette is played in turn and automatically returned to its storage compartment 14 after having been played once.

In accordance with the present invention, repeat play of a cassette 15 may be instituted upon operation of a selector 39 which is on a control panel 41 of the cassette changer to a repeat position. As will be explained in detail, operation of the repeat selector 39 disables the magazine feed mechanism and permits a repetitive cyclic playing of the cassette until the repeat selector 39 is returned to its non-repeat position. That is, the magazine remains stationary while the cassette transfer mechanism including the elevator 37 moves through its usual and complete cycle of returning the cassette to its magazine compartment 14; but, instead of feeding the magazine forwardly and extracting the next cassette, the previously played cassette is again extracted and lowered to the tape transducer head 33 for another playback. When the repeat selector 39 is returned to its non-repeat position, the magazine feed means is enabled to shift the magazine and bring the next compartment 14 and the next cassette into the transfer station 21.

Figure 1:
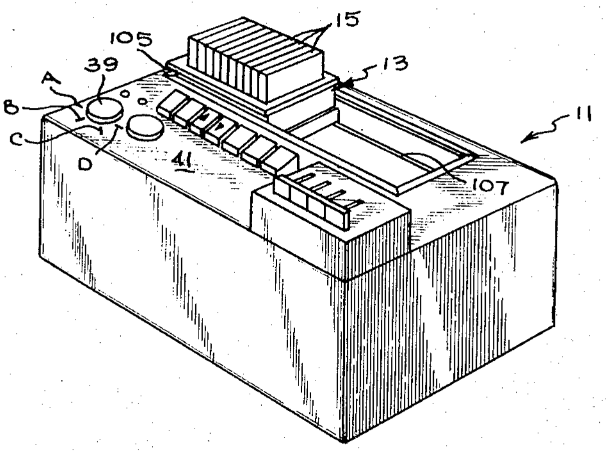
FIG. 1 is a perspective view of a cassette changer apparatus embodying the invention.
Figures 2, 5:
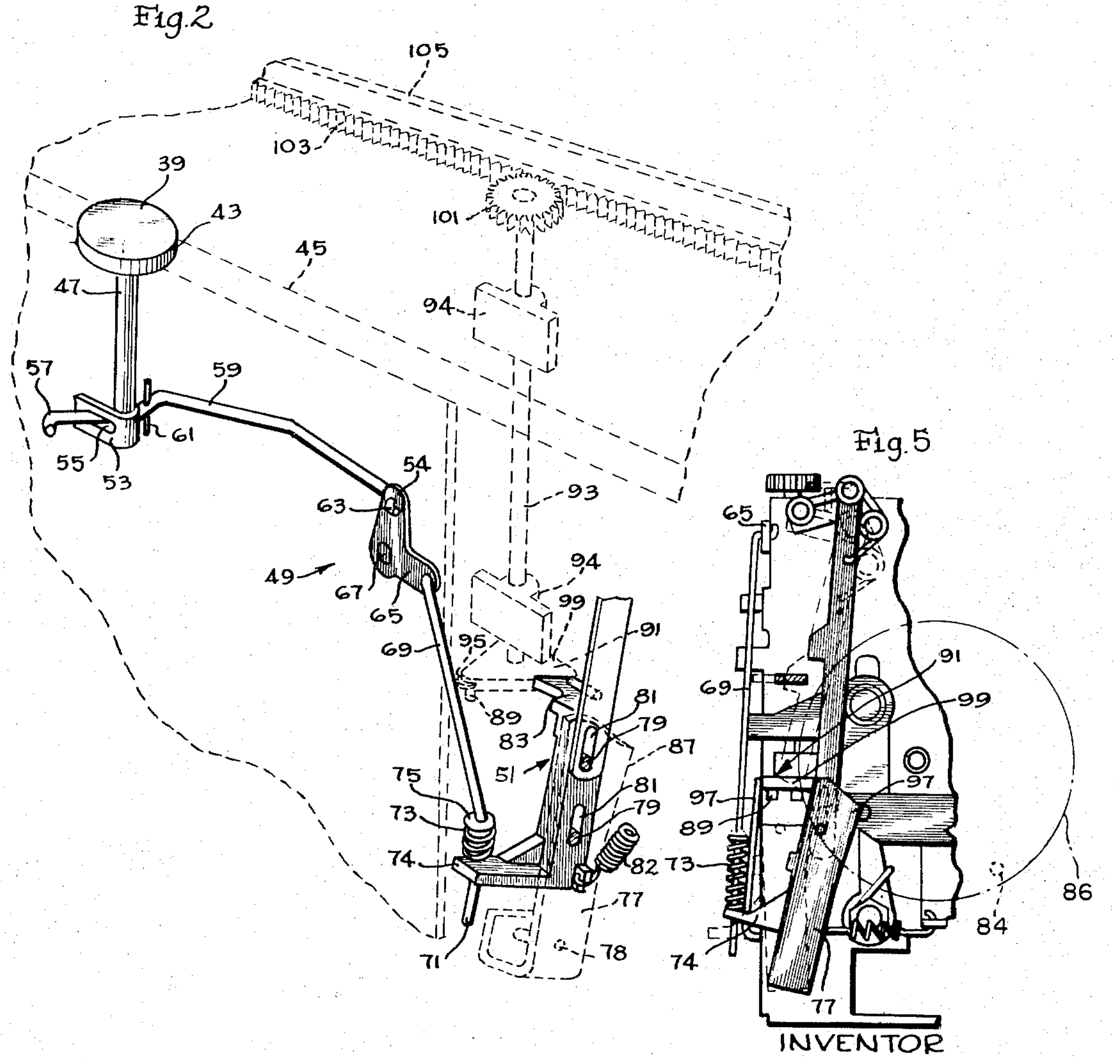
FIG. 2 is a fragmentary, diagrammatic, perspective view of mechanisms for causing a repeat playing of a cassette tape.
FIG. 5 is a side view of a magazine feed mechanism.

Referring now more specifically to the detailed elements of the invention, the selector 39 includes, in this instance, a manually turnable knob 43 projecting above a top plate 45 for the cassette changer and a vertically disposed shaft 47 which is attached to the knob 43 and journaled for turning in the top plate 45. The shaft 47 extends below the top plate and operates a linkage 49 to shift a feed pawl 51 of the magazine feed mechanism between a stepping position in which the magazine 13 shifts and a non-stepping position in which the magazine will remain stationary. On the lower end of the selector shaft 47 is a selector arm 53 which is provided with a lost motion connection to the linkage 49 so that the selector arm 53 operates the linkage 49 only when the selector is shifted between the repeat and non-repeat positions. The lost motion connection is constituted by an elongated slot 55 through which projects an end 57 of a selector link 59 which is in the form of an elongated bent wire with an offset end inserted through the elongated slot 55 in the selector arm 53. When the selector arm 53 is turned by the knob 43 between ones of several non-repeat positions, the selector link 59 remains stationary as the arm slides along the link at its slot 55. In this instance, the selector 39 may be turned to and through several positions such as a "repeat" position A; an "auto" position B; a "side one" position C; and a "side two" position D. When the selector 39 is turned to the "repeat" position A, the selector arm 53 abuts a cross pin 61 fixed to and extending laterally from the selector links 59 and forces the selector link to the right as viewed in FIG. 2. The right end of the selector link 59 is in the form of a hook 63 inserted into an opening of a bellcrank 54, the latter being pivotally mounted on a horizontal pivot post 67 fixed to a stationary vertical frame plate (not shown).

The bellcrank 65 converts the horizontal movement of the selector link 59 into a vertical movement of a repeat link 69 which is also in the form of an elongated wire having an upper end hooked to a lower arm of the bellcrank. A lower end 71 of the repeat link 69 is inserted through an aperture in a horizontally extending foot 74 on the feed pawl 51, and a coiled spring 73 is seated atop of this foot 74 and extends upwardly to abut a stop or washer-like member 75 which encircles the repeat link. The member 55 is limited in its upward travel on the link by a swaged portion on the link having a larger dimension than the dimension of the hole in the washer. Therefore, a downward movement of the repeat link 69 acts through the member 75 and spring 73 to force the pawl 51 to slide downwardly on a pawl carrier lever 77.

The pawl 51 is constrained for sliding by vertically spaced pins 79 which are fastened to the pawl carrier lever 77 and which project horizontally into and through vertically extending, elongated openings 81 in an elongated vertical body portion of the pawl 51. A pawl is biased upward to a position for causing the magazine to feed forwardly by a contractile spring 82 connected at its lower end to the pawl 51 and its upper end to the pawl carrier 77. The spring 82 biases the pawl upward to a stepping position with the pins 79 abutting the bottom of the openings 81.

As disclosed more fully in the copending patent application entitled "Cassette Lowering and Release Apparatus" filed of even date, the pawl carrier lever 77 is pivotally mounted at its lower end on a pivot stud 78 carried by a fixed vertical wall of the cassette changer for pivoting by a cam pin 84 carried on a rotatable cam 86 after return of the cassette into its storage compartment in the magazine 13. The cam pin 84 abuts a vertically inclined surface 87 on the pawl carrier lever 77 to pivot it about its axis of rotation at the pin 78 and swing the pawl tooth 83 to abut one of three cylindrically shaped nibs 89 depending from the bottom of a triangular shaped plate 91 fixed to a lower end of a vertically extending shaft 93 mounted in brackets 94 fixed to the vertical wall.

The pawl tooth 83 abuts a nib 89 at a position offset from the axis of the shaft 93 and turns the triangular shaped plate 91 and shaft 93 through at least 60 ° to move a roller 95 at a point on the triangular shaped plate against a flat, vertical biasing member 97 to flex the biasing member 97 outwardly from a flat side 99 of triangular plate. Once the pawl turns the triangular plate corner 95 past a dead center position relative to the biasing member 97, the triangular plate is forced by the latter to continue turning to complete its 120 ° of turning at which the biasing member 97 again abuts a flat side 99 of the triangular plate. The biasing member 97 also resists turning of the shaft 93 through an arc of greater than 120 ° of turning. A drive gear 101 is fixed to the upper end of the shaft 93 and this drive gear is meshed with a rack 103 fixed to a longitudinal side 105 of the magazine 13. Each 120 ° movement of the gear 101 by the shaft 93 results in a longitudinal sliding of the magazine along guide rails 107 in the cassette changer frame sufficiently to shift one compartment 14 from the transfer station and shift the next compartment into it. In this way, the magazine may be advanced to bring into exact alignment each compartment for transfer of its cassette therefrom.

To facilitate a better understanding of the invention, a brief description of the operation of the repeat mechanism will now begin. Upon operation of the selector 39 in the clockwise direction from one of the positions B, C or D to the "repeat" position "A," the selector arm 53 abuts the cross pin 61 on the selector link 59 and forces the selector link to travel horizontally and pivot the bellcrank 65 in the clockwise direction. The lower arm of the bellcrank forces the repeat link 69 downwardly and the latter acts through washer-like member 75 on the spring 73 with sufficient force on the outwardly directed leg of the pawl 51 to slide the pawl downwardly against the opposing force of return spring 82 to a position in which the pawl tooth 83 is in a plane beneath the nibs 89 on the triangular plate 91. Thus, when the pawl carrier lever 77 pivots and carries the tooth 83 laterally, the pawl tooth moves laterally beneath the nibs and through an arc without engaging one of the nibs 89. Hence, the magazine remains stationary.

The magazine will remain stationary until the selector 39 is returned by the operator to one of the other positions B, C or D and shifts selector arm 53 out of operative contact with the cross pin 61 on the link 59 at which time the compressed spring 73 expands and forces the repeat link 69 upwardly turning the bellcrank 65 in the counterclockwise direction thereby forcing the selector link 59 to the left to a position where it is ready for engagement when the selector arm 53 is again turned into the "repeat" position. The pawl 51 is lifted upwardly by the return spring 82 and is limited by the pins 79 in the slots 81 to a position at which the tooth 83 is in an intersecting plane with the nibs 89 to contact one of the same on the next pivotal movement of the pawl carrier lever 77.

From the foregoing, it will be seen that the cassette changer 11 is provided with a repeat mode of operation for repetitive play of the cassette. The repeat mode mechanism is both simple and inexpensive which are most desirable in cassette changers of this kind.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a cassette changer for cassettes having a tape wound on and extending between tape reels, a magazine having a series of compartments for holding cassettes in storage positions, said magazine being slidable along a straight line path to bring each compartment to a transfer station at which a cassette is transferred from its compartment to an operative position for playback or recording onto the cassette tape, cyclically operable means operable through a plurality of consecutive cycles to position each of a plurality of cassettes in said operative position and including a shiftable chassis having spindles for simultaneously penetrating the tape reels during transfer of the cassette from a storage position to said operative position, a transducer head, a slidable carrier for said transducer head slidable from a position in which said transducer head is spaced from the tape to an operative position to engage the tape, forward feed means for feeding the tape in a cassette forwardly for a playback or recording operation, reverse feed means for feeding the tape in a cassette in a reverse direction for a playback or recording operation, said shiftable chassis being movable away from said cassette to simultaneously retract both of said spindles, said cyclically operable means being operable to return the cassette to its compartment in said magazine, means including a rack and pinion for sliding said magazine upon return of a cassette to its compartment to shift the next succeeding compartment into said transfer station until the last of said compartments is aligned at said transfer station, means including a pawl movable when in an operative position to turn said pinion, and selectively operable means including a manually turnable selector and a linkage means extending from said selector to said pawl to shift said pawl to an inoperative position and to disable said pinion from turning and from shifting said magazine to bring the next compartment and the cassette therein into the transfer station, the compartment of the previously played cassette being retained at said transfer station to receive the same cassette and for its return therefrom by said cyclically operable means for a repeat of the tape therein with the next operation of said cyclically operable means, said linkage means including a link and a lever, said selector being positionable in each of several positions in which operations other than the repeat playing operation may be instituted, said selector having a lost motion connection with said linkage means so that said pawl is disabled only when said selector is positioned for a repeat operation.

2. In a cassette changer for cassettes having a tape wound on and extending between tape reels, a magazine having a series of compartments for holding cassettes in storage positions, said magazine being slidable along a straight line path to bring each compartment to a transfer station at which a cassette is transferred from its compartment to an operative position for playback or recording onto the cassette tape, cyclically operable means operable through a plurality of consecutive cycles to position each of a plurality of cassettes in said operative position and including a shiftable chassis having spindles for simultaneously penetrating the tape reels during transfer of the cassette from a storage position to said operative position, said shiftable chassis being movable away from said cassette to simultaneously retract both of said spindles, said cyclically operable means being operable to return the cassette to its compartment in said magazine, means including a rack and pinion for sliding said magazine upon return of a cassette to its compartment to shift the next succeeding compartment into said transfer station until the last of said compartments is aligned at said transfer station, means including a pawl movable when in an operative position to turn said pinion, and selectively operable means to shift said pawl to an inoperative position and to disable said pinion from turning and from shifting said magazine to bring the next compartment and the cassette therein into the transfer station, the compartment of the previously played cassette being retained at said transfer station to receive the same cassette and for its return therefrom by said cyclically operable means for a repeat playing of the tape therein with the next operation of said cyclically operable means, said selectively operable means comprising a manually operable selector on said changer movable to and from a repeat operation position, a first link actuatable by said selector when moved to said repeat operation position, a bellcrank means connected to and operable by said first link, a second link connected to and actuated by said bellcrank means, said second link being connected to said pawl to shift said pawl to its inoperative position with operation of said manual selector, and spring means biasing said links and said bellcrank means to return with return of said manual selector from its repeat operation position.

* * * * *